US006962143B2

(12) United States Patent
Ryan, III et al.

(10) Patent No.: US 6,962,143 B2
(45) Date of Patent: Nov. 8, 2005

(54) HIGH-EFFICIENCY, LOW EMISSION GASOLINE ENGINES FOR HEAVY-DUTY APPLICATIONS

(75) Inventors: Thomas William Ryan, III, San Antonio, TX (US); Robert Wayne Burrahm, San Antonio, TX (US); Rudolf Hermann Stanglmaier, San Antonio, TX (US); Charles Edward Roberts, Jr., San Antonio, TX (US); James Corwin Snyder, San Antonio, TX (US); Lee Gene Dodge, San Antonio, TX (US); Daniel William Stewart, Helotes, TX (US); Timothy Joseph Callahan, San Antonio, TX (US); John Thomas Kubesh, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/619,456

(22) Filed: Jul. 16, 2003

(65) Prior Publication Data
US 2005/0011485 A1 Jan. 20, 2005

(51) Int. Cl.$^7$ .............................................. F02B 3/10
(52) U.S. Cl. ..................... 123/481; 123/299
(58) Field of Search .................. 123/90.15, 90.16, 123/90.17, 90.18, 481, 673, 691, 703, 299

(56) References Cited

U.S. PATENT DOCUMENTS

| 4,134,261 | A | * | 1/1979 | Iizuka et al. .................. 60/276 |
| 4,274,373 | A | * | 6/1981 | Sugasawa et al. ............. 60/276 |
| 4,411,228 | A | * | 10/1983 | Sugasawa .................... 123/481 |
| 6,401,688 | B2 | * | 6/2002 | Teraji et al. ................. 123/295 |
| 6,405,527 | B2 | * | 6/2002 | Suzuki et al. ............... 123/481 |
| 6,415,601 | B1 | * | 7/2002 | Glugla et al. ................ 60/284 |
| 6,561,145 | B1 | * | 5/2003 | Stockhausen et al. .... 123/90.15 |
| 6,636,797 | B2 | * | 10/2003 | Yoshizawa et al. ......... 701/104 |
| 6,681,751 | B1 | * | 1/2004 | Ma ............................. 123/676 |
| 6,687,603 | B2 | * | 2/2004 | Wakashiro et al. ...... 123/198 F |
| 2004/0011322 | A1 | * | 1/2004 | Gerhardt .................... 123/295 |
| 2004/0016425 | A1 | * | 1/2004 | Ma ............................. 123/481 |

* cited by examiner

*Primary Examiner*—Erick Solis
(74) *Attorney, Agent, or Firm*—Gunn & Lee, P.C.; Ted D. Lee

(57) ABSTRACT

A heavy-duty flame propagation engine has control systems and exhaust aftertreatment systems adapted to provide ultra-low emissions relative to Diesel engines while achieving comparable fuel consumption at reduced emission levels. The control systems include exhaust gas circulation, variable valve actuation, cylinder deactivation, pilot fuel injection, high energy ignition systems and combinations thereof to provide substantially stoichiometric combustion conditions over an entire load range of the engine. In one embodiment, the engine has direct in-cylinder fuel injection, is adapted for lean air-fuel mixture operation, and includes an oxidation catalyst and a lean NOx adsorber.

2 Claims, 2 Drawing Sheets

HIGH-EFFICIENCY, LOW EMISSION GASOLINE ENGINES FOR HEAVY-DUTY APPLICATIONS

BACKGROUND OF THE INVENTION

1. Technical Field

This invention relates generally to a reciprocating engine fueled on any fuel that can be ignited by ignition spark or other high energy ignition system suitable for use in heavy-duty vehicle applications, and more particularly to such an engine having high efficiency while producing low emissions. For purposes of this invention, flame propagation engines are ones in which a mixture of fuel and air is created and ignited in-cylinder by suitable means. The resulting flame travels through the fuel-air mixture. Conventional spark ignition engines are examples of this type of engine. This is opposed to a diffusion burn type engine, like a conventional Diesel engine, in which most of the fuel burns in a diffusion manner.

2. Background Art

The U.S. Environmental Protection Agency (EPA) has set very stringent emissions standards for heavy-duty vehicles that would reduce smog-causing emissions from trucks, buses and motor homes. The emissions standards set forth for model year 2007 include two components, emissions standards and Diesel fuel regulation. The first component of the regulation introduces new, very stringent emission standards, as follows:

Particulate matter (PM)—0.01 g/bhp-hr
Nitrogen oxide (NOx)—0.20 g/bhp-hr
Non-methane hydrocarbons (NMHC)—0.14 g/bhp-hr.

The particulate matter emissions standard will take full effect in the 2007 heavy-duty engine model year. The NOx and NMHC standards will be phased in for Diesel engines between 2007 and 2010. The phase-in would be on a percent-of-sales basis: 50% in 2007–2009, and 100% in 2010. Gasoline engines are subject to the same standards based on a phase-in requiring 50% compliance in 2008 and 100% compliance in 2009. The Diesel fuel regulation limits the sulfur content in on-highway Diesel fuel to 15 ppm (wt.), down from the previous 500 ppm. Refiners will be required to start producing the 15 ppm sulfur fuel beginning Jun. 1, 2006. Ultra-low sulfur Diesel fuel has been mandated as a "technology enabler" to pave the way for advanced, sulfur-intolerant exhaust emission control technologies, such as catalytic Diesel particulate filters, lean NOx adsorbers, and NOx catalysts, all of which will be necessary to meet the 2007 emissions standards. Moreover, it is anticipated that significant engine modifications will be required, such as a high pressure common rail, massive cooled exhaust gas recirculation, low pressure loop exhaust gas recirculation after a particulate matter trap, high boost provided by a supercharger or turbocharger, NOx sensors, model-based control schemes, and on-board diagnostic (OBD) systems. PM control will require catalyzed particulate matter traps, and NOx control will require NOx adsorbers. Therefore, it is essential that low sulfur fuel be available to meet the performance requirements of the catalyzed PM traps and NOx adsorbers.

Diesel engines have traditionally been considered as the most efficient reciprocating engine. However, NOx emissions are typically one hundred times those produced by spark ignition engines and PM emissions are one thousand times those produced by spark ignition engines. Moreover, Diesel engines cost twenty to forty percent more than a comparable horsepower flame propagation engine. When comparing the viability of a flame propagation engine to replace a Diesel engine in heavy-duty applications, the comparison must be made at the same emissions levels. The Diesel engine needs PM traps and lean NOx adsorbers. Thus, Diesel engine costs at the same emissions level are a factor of 2–3 more. Morever Diesel efficiency approaches that of flame propagation engines at the future mandated emissions levels.

For heavy-duty Diesel vehicles, the EPA categorizes Classes 2B thru 5 (8,501 to 19,500 gross vehicle weight rating (GVWR)) as light heavy-duty, Classes 6 and 7 (19,501 to 33,000 GVWR) are categorized as medium heavy-duty, and Class 8 (33,000 GVWR and above) as heavy heavy-duty.

The present invention is directed to overcoming the inherent problems, i.e., the difficulty and expense associated with achieving future emissions reductions in Diesel engines. It is desirable to have an engine for heavy-duty vehicular applications that takes advantage of the lower cost and lower emissions inherently provided by flame propagation engines and has an operating efficiency (BSFC) comparable to that of Diesel engines. Such an engine would readily replace Diesel engines in all classes of heavy-duty vehicular applications, thereby greatly reducing pollution attributable to vehicles falling within those classes.

SUMMARY OF THE INVENTION

In accordance with one aspect of the present invention, a heavy-duty flame propagation engine has at least one intake port through which a mixture of air and fuel is introduced into a combustion chamber of the engine, an intake manifold in fluid communication with a source of combustion air and a combustion engine, and a means for controllably introducing fuel into the combustion chamber either through direct in-cylinder injection or through injection in the intake manifold. The engine further includes an exhaust system having a three-way catalyst, a lean NOx adsorber system, or other lean NOx control devices incorporated therein.

Other features of the port fuel injected flame propagation engine embodying the present invention include a fuel injector disposed in the intake manifold at a position adjacent of the combustion chamber intake port, a means for controlling the air fuel mixture and provide a substantially stoichiometric mixture of air and fuel into the combustion chamber of the engine. The means by which a substantially stoichiometric mixture of air and fuel is maintained in the combustion chamber of the engine includes a sensor disposed in the exhaust system that is adapted to measure oxygen concentration and generate a signal suitable for use as a feedback air fuel ratio control that is provided to an electronic engine control unit. The port fuel injected engine further includes a means for controlling the flow of air passing through the manifold. Furthermore, the engine includes a means for controllably deactivating selected combustion chambers and a means for varying the operation of intake and exhaust valves associated with each of the combustion chambers. Also, the engine desirably has a means for controlling the recirculation of exhaust gas from the exhaust system to the intake manifold.

In accordance with another aspect of the present invention, a heavy-duty flame propagation engine has a fuel injector disposed in each combustion chamber that is adapted to inject fuel directly into the combustion chamber. The direct injected flame propagation engine also includes a means for controlling the timing of fuel injection into the combustion chamber to form either a lean stratified air fuel mixture and, when injected during an intake stroke of the engine, forms a homogenous stoichiometric air fuel mixture.

The direct injected heavy-duty engine further includes an exhaust gas recirculation system adapted to recirculate controlled portions of exhaust gas from an exhaust manifold and an intake manifold. One embodiment of the invention also incorporates a pilot fuel injector in direct communication with the combustion chamber or incorporated in the main injector whereby the injection of fuel in advance of a primary fuel injection provides stoichiometric combustion over substantially all of the engine operating load range. Also, the heavy-duty direct injected engine desirably has an oxidation catalyst and a lean NOx control device disposed in the exhaust system of the engine for lean operation, or a three-way catalyst system for stoichiometric operation.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF THE PREFERRED EMBODIMENTS

Figure 1:
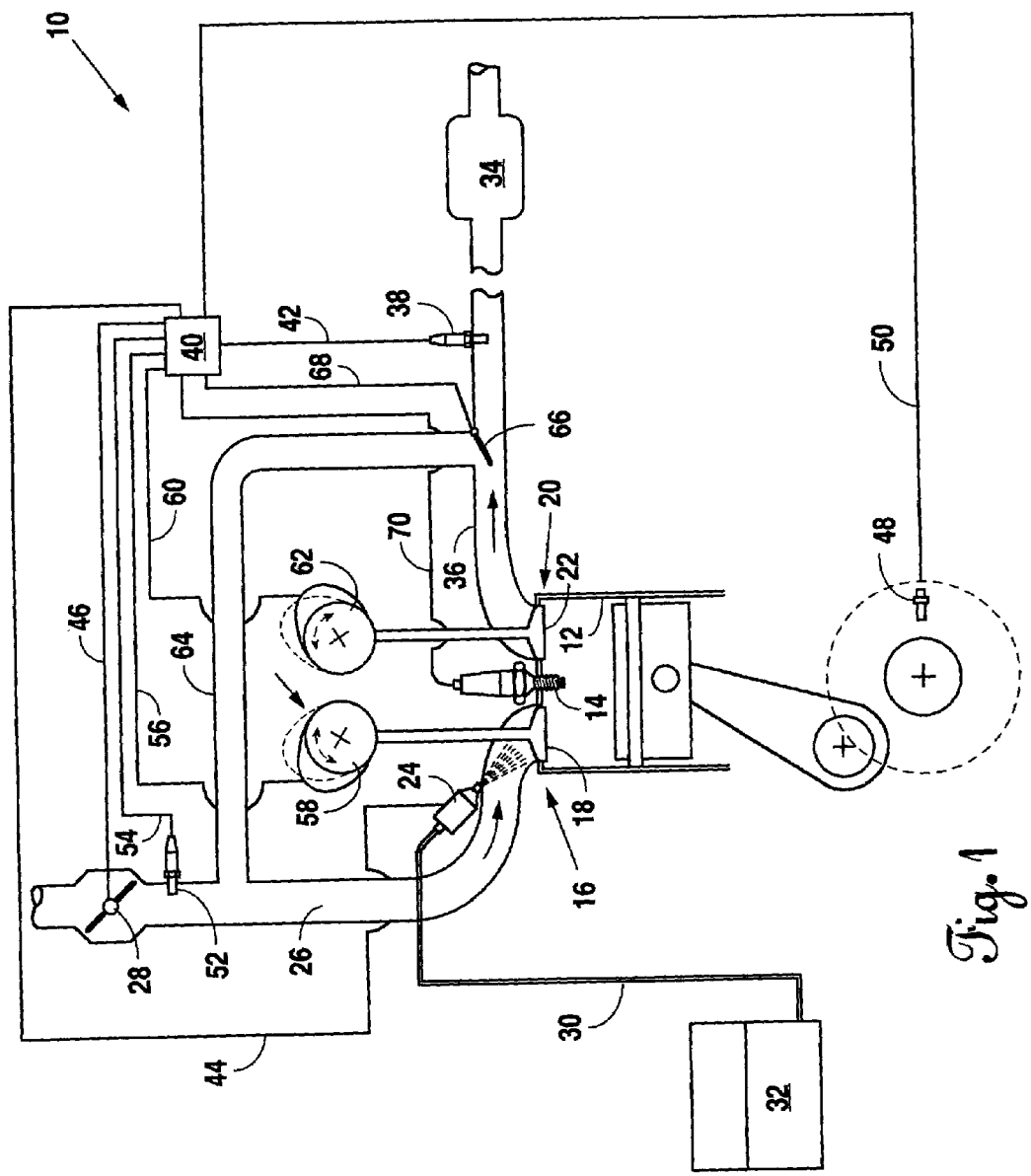
FIG. 1 is a schematic illustration of a port fuel injected flame propagation engine embodying the present invention.

In a first embodiment of the present invention, the heavy-duty port fuel injected engine is generally indicated by the reference numeral 10 in FIG. 1. Engine 10 typically has plurality of combustion chambers 12, a representative one of which is shown for simplicity of illustration. Each combustion chamber has a sparkplug 14, or other active ignition device such as a pilot fuel injector or laser ignition system, disposed in communication with the combustion chamber. Each combustion chamber 12 also has at least one intake port 16 controlled by an intake valve 18, and at least one exhaust port 20 controlled by an exhaust valve 22. In this embodiment, a port fuel injector 24 is disposed in an intake manifold 26 at a position adjacent the combustion chamber intake port 16 and provides a means whereby fuel is controllably introduced through the intake manifold 26 and into the combustion chamber 12. The intake manifold is in controlled fluid communication with a source of combustion air by way of a throttle valve 28 disposed in the intake manifold, and with the combustion chamber 12 by way of the intake port 16. The port fuel injector 24 is in controlled fluid communication, by way of a fuel line 30, with a source of fuel 32 suitable for use in flame propagation engines.

In accordance with the present invention, the engine 10 has a single-stage three-way catalyst 34 disposed in an exhaust system 36. Three-way catalysts require precise fuel control to be effective, and are effective in the vicinity of stoichiometric ratio, i.e., an air to fuel ratio from about 14.5 to about 14.6 whereat fuel and oxygen in the air can both be completely consumed if reactions are complete. Thus, stoichiometric operation is required if the catalyst 34 is to effectively remove the three most common pollutants in engine exhaust: carbon monoxide (CO), hydrocarbons (HC), and various oxides of nitrogen (NOx). For such a purpose, the present invention includes a means for controlling the air fuel mixture and provide a substantially stoichiometric mixture of air and fuel in the combustion chamber 12 of engine 10.

A means for maintaining the required mixture strength near stoichiometric includes an oxygen sensor 38, such as a zirconia or titanium oxide exhaust oxygen sensor (EGO), disposed in the exhaust system 36 at a position upstream of the three-way catalyst 34, and a programmable electronic engine control unit (ECU) 40. The EGO sensor 38 detects the exhaust gas air to fuel ratio based on the oxygen concentration in the exhaust gas and provides a signal 42 to the ECU 40 that is suitable for use as a feedback air/fuel ratio control signal. The ECU 40 generates a control signal 44 that controls timing and duration of fuel injection through the port fuel injector 24 and a throttle valve position control signal 46 that controls opening or closing of the throttle valve 28, thereby providing a means whereby air flow through the intake manifold 26 is controlled. Typically, additional sensors representative of prevailing engine operating parameters, such as a crankshaft position sensor 48 that provides a signal 50 representative of engine crankshaft position and an intake air mass flow sensor 52 that provides a signal 54 representative of intake air flow to provide additional data input to the ECU 40 for use, and in accordance with preprogrammed maps, instructions, or through the use of model-based control algorithms, to assure stoichiometric operation over substantially all of the engine operating regime. In a conventional manner, the ECU 40 controls operation of the ignition device 14 by a control signal 70.

Desirably, the heavy-duty port fuel injected engine 10 includes a means for varying the operation of intake valve 18 in the exhaust valve 22. The ECU 40, in response to the values provided by the EGO signal 42, the crankshaft position signal 50, the intake air mass flow signal 54, and/or other signals not specifically described but representative of prevailing engine operating parameters, delivers a control signal 56 to a first conventional variable valve actuating system 58 to control opening and closing of the intake valve 18 and a control signal 60 to a second conventional variable valve actuating system 62 to control operation of exhaust valve 22.

Flame propagation engines, for example spark ignition engines, inherently operate less efficiently at low load because of pumping losses caused by throttling. In the heavy-duty flame propagation engine 10 embodying the present invention, engine efficiency is desirably increased by control of the intake valve 18 and exhaust valve 22 timing, including deactivation of selected cylinders so that the remaining activated cylinders operate at higher loads. Merely cutting off the fuel supply to the deactivated cylinders achieves a desirable reduction in fuel consumption, but when the disabled cylinders are still allowed to pump air, the stoichiometry of exhaust gases is upset and this interferes with the operation of the catalyst 34. In addition, the disabled cylinders would further contribute to the overall inefficiency of the engine through pumping losses. Also, the presence of excess air in exhaust gases means that the catalyst 34 cannot neutralize NOx present in the exhaust gases, as this requires stoichiometric or reducing atmosphere. Therefore, in accordance with the present invention, a means for controllably deactivating selected cylinders, based on engine load, includes the aforementioned variable valve actuation systems 58, 62, which close the intake valve 18 and exhaust valve 22 of the cylinder or cylinders selected for deactivation. Concurrently, the ECU 40, by way of the control signal 44, closes the port fuel injector of the deactivated cylinder to interrupt the delivery of fuel to the deactivated cylinder.

Advantageously, the heavy-duty flame propagation engine 10 comprising the above-described first embodiment includes a means for controlling the recirculation of exhaust gas from the exhaust system 36 to the intake manifold 26 by way of a recirculation manifold 64 extending between the exhaust system 36 and the intake manifold 26. Flow through the recirculation manifold 64 is controlled by a modulatable three-way valve 66 that, when receiving a control signal 68 from the ECU 40, diverts a controlled portion of the exhaust gases through the recirculation manifold 64 to the intake manifold 26 and subsequently into the combustion chamber 12. If desired, the recirculated exhaust gases maybe passed through a heat exchanger to control gas temperature. The quantity of recirculated exhaust gases may be controlled to minimize NOx emissions and also to control the overall air-fuel ratio of the engine.

The above-described first embodiment of the present invention may incorporate any of several alternate high energy ignition systems such as conventional spark, spark with torch ignitor design, rail plug designs, laser ignition, pilot injection of Diesel fuel or other low auto ignition ignitor fuel, or other high energy ignition systems capable of igniting highly diluted air-fuel-exhaust gas mixtures.

Figure 2:
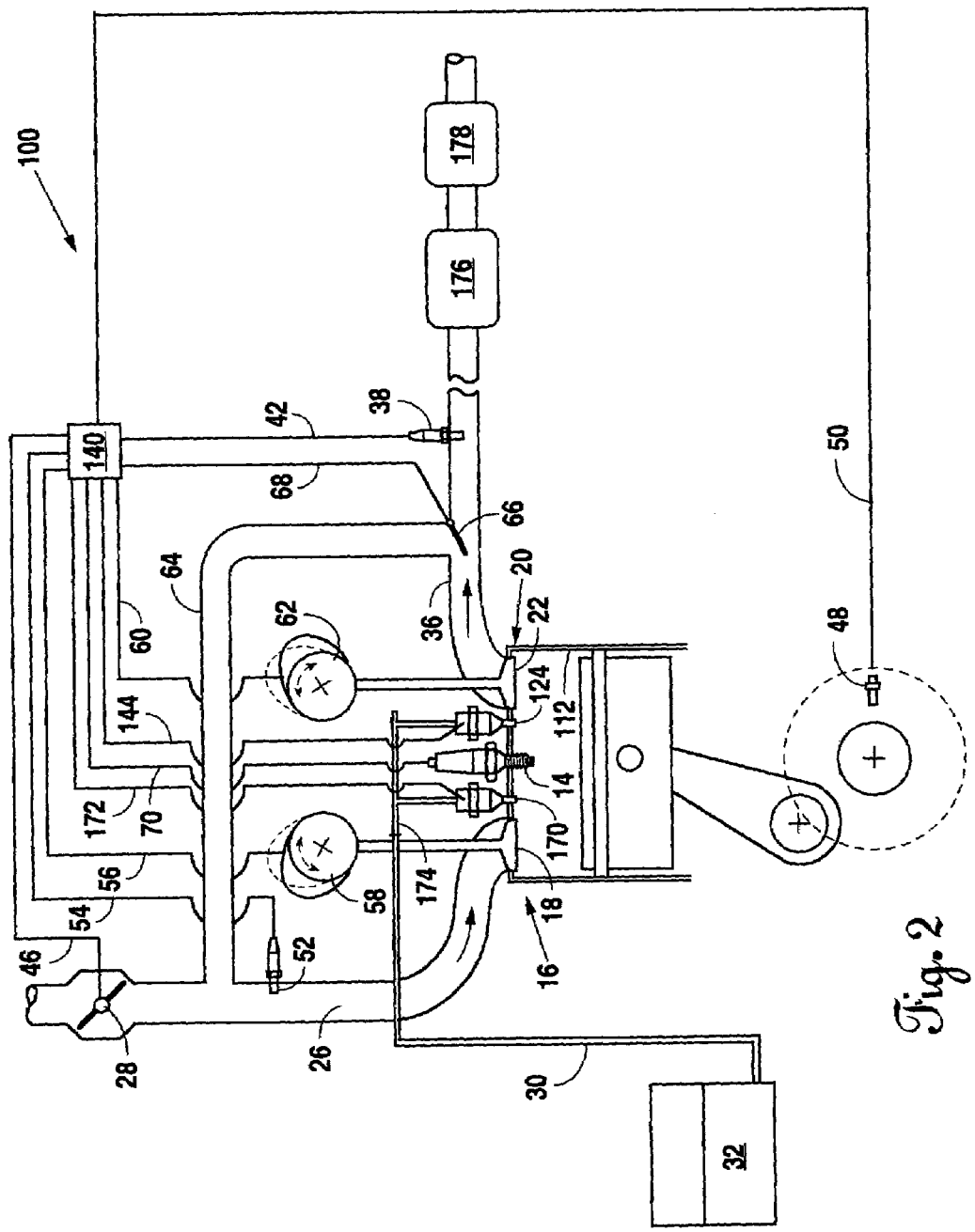
FIG. 2 is a schematic illustration of a direct injected flame propagation engine embodying the present invention.

In a second embodiment of the present invention, a heavy-duty direct injection flame propagation engine is generally indicated by the reference number 100 in FIG. 2. In the following description, elements of the above-described first embodiment that are common in structure and function with the engine 100 of the second embodiment are identified in FIG. 2 by the same reference numbers used in FIG. 1. Furthermore, in order to avoid redundancy, the description and operation of the common elements should be understood to be equally applicable to the second embodiment, and therefore will not be repeated hereafter.

In the second embodiment, the engine 100 has the plurality of combustion chambers 112, a representative one of which is shown for simplicity of illustration. Each combustion chamber 112 has a fuel injector 124 having a nozzle portion disposed in direct communication with the combustion chamber and is adapted to inject fuel directly into the combustion chamber. A means for controlling the timing and duration of fuel injection into the combustion chamber includes a programmable electronic engine control unit (ECU) 140 that provides a control signal 144 to the injector 124 for controlling the timing and duration of fuel injection into the combustion chamber 112 in response to the sensed values of one or more of the signals generated by the above-described sensors adapted to provide signals representative of prevailing engine operating parameters. The ECU 140 is capable of causing the combustion chamber 112 to operate in either a stoichiometric homogenous air/fuel mode, or in a lean stratified air/fuel mode by controlling injection timing. When fuel is injected into the combustion chamber 112 during a compression stroke of the engine, a stratified air/fuel mixture is formed in the combustion chamber, and when fuel is injected during an intake stroke of the engine a substantially homogenous stoichiometric air/fuel mixture is present when the injection process is initiated by the sparkplug, or other suitable controllable ignition system, 114. Thus, the ECU 140 controls the timing and amount of fuel delivered by the fuel injector 124 so that the homogenous air/fuel mixture in the combustion chamber 112 is substantially at, or near stoichiometry. The stratified air/fuel mixture is formed when fuel is injected directly into the combustion chamber 112 during the compression stroke and stratified air/fuel layers are formed in the combustion chamber. The stratified air/fuel mixture will generally be at a value lean of stoichiometry, the exact air/fuel ratio being a function of the amount of fuel injected.

Desirably, the heavy-duty direct injected engine 100 in the second embodiment of the present invention, a pilot fuel injector 170, or a primary fuel injector capable of two or more injections per engine cycle, having a nozzle portion disposed in direct communication with the combustion chamber 112 provides a means for controllably injecting fuel, in response to a control signal 172 provided by the ECU 140 in advance of a primary injection of fuel through the fuel injector 124 in response to a control signal 144 generated by the ECU 140. Pilot fuel injection provides greater flexibility in maintaining the desired air-fuel mixtures under load or partial load operation as well as under normal or high load conditions. For example, pilot fuel injection may be injected late in the expansion stroke or early in the compression stroke to provide a substantially homogeneous air/fuel mixture, and a primary fuel injection made at or near the end of the compression stroke to provide a lean stratified air/fuel mixture. Conversely, primary fuel injection could occur early to form a lean homogenous air/fuel mixture for primary combustion, and pilot injection made late in the compression stroke to form a readily ignitable overall stoichiometric air/fuel mixture.

In the heavy-duty injection flame propagation engine 100, exhaust aftertreatment is then advantageously carried out by an oxidation catalyst 176 and in a lean NOx trap 178 position downstream of the oxidation catalyst. The oxidation catalyst 176, in the presence of stoichiometric exhaust products oxidizes carbon monoxide and hydrocarbons. The lean NOx trap 178 typically operates cyclically in which NOx is stored at lean operating conditions and subsequently purged under slightly rich operating conditions.

The present invention is particularly useful for flame propagation engines in heavy duty applications to achieve ultra-low emissions relative to Diesel engines while providing brake specific fuel consumption (BSFC) comparable to that of Diesel engines in which BSFC is reduced by compromises imposed to overcome inherently higher emissions.

Although the present invention is described in terms of preferred illustrative embodiments, those skilled in the art will recognize variations on, or combinations of, the described embodiments can be made in carrying out the present invention. For example, the throttle valve described in the embodiments may be omitted or deactivated and the engine operated in an un-throttled mode. Also, the pilot fuel injector or the primary fuel injection described in the second embodiment could be placed in the intake manifold to provide port fuel injection for that specific injector. Such arrangements embodying the present invention are intended to fall within the scope of the following claims.

Other aspects, features, and advantages of the present invention may be obtained from the study of this disclosure and the drawings, along with the appended claims.

What is claimed is:

1. A heavy duty flame propagation engine having at least one combustion chamber having at least one intake port through which a mixture of air and fuel is introduced into said combustion chamber, said engine comprising:

an intake manifold in controlled fluid communication with a source of combustion air and said combustion chamber;

a means for controllably introducing fuel through an intake port disposed between said intake manifold and said combustion chamber;

an exhaust system in controlled fluid communication with said combustion chamber;

a three-way catalyst disposed in said exhaust system;

a means for controlling the air-fuel mixture and provide a substantially stoichiometric mixture of air and fuel into said combustion chamber of the engine;

a includes a plurality of combustion chambers and a means for controllably deactivating selected ones of said combustion chambers;

at least one intake valve adapted to control the flow of the mixture of air and fuel provided to said combustion chamber, at least one exhaust valve adapted to control the flow of said exhaust gases from said combustion chamber into said exhaust system, and a means for varying the operation of said intake valve and said exhaust valve; and wherein said engine includes a pilot fluid injector in direct communication with said combustion chamber and a means for controllably injecting fuel in the combustion chamber in advance of a primary injection of fuel.

2. A heavy duty flame propagation engine having at least one combustion chamber having at least one intake port through which a mixture of air and fuel is introduced into said combustion chamber, said engine comprising:

an intake manifold in controlled fluid communication with a source of combustion air and said combustion chamber;

a means for controllably introducing fuel through an intake port disposed between said intake manifold and said combustion chamber;

an exhaust system in controlled fluid communication with said combustion chamber;

a three-way catalyst disposed in said exhaust system;

a means for controlling the air-fuel mixture and provide a substantially stoichiometric mixture of air and fuel into said combustion chamber of the engine;

a includes a plurality of combustion chambers and a means for controllably deactivating selected ones of said combustion chambers;

at least one intake valve adapted to control the flow of the mixture of air and fuel provided to said combustion chamber, at least one exhaust valve adapted to control the flow of said exhaust gases from said combustion chamber into said exhaust system, and a means for varying the operation of said intake valve and said exhaust valve; and wherein said fuel injector is adapted to inject fuel into said combustion chamber at selected multiple times during each engine cycle.

* * * * *